(12) United States Patent
Chen

(10) Patent No.: US 9,457,476 B2
(45) Date of Patent: Oct. 4, 2016

(54) MECHANISMS FOR POSITIONING ROBOT BLADE

(71) Applicant: Taiwan Semiconductor Manufacturing Co., Ltd., Hsin-Chu (TW)

(72) Inventor: Shih-Hung Chen, Zhubei (TW)

(73) Assignee: TAIWAN SEMICONDUCTOR MANUFACTURING CO., LTD, Hsin-Chu (TW)

( * ) Notice: Subject to any disclaimer, the term of this patent is extended or adjusted under 35 U.S.C. 154(b) by 174 days.

(21) Appl. No.: 14/079,779

(22) Filed: Nov. 14, 2013

(65) Prior Publication Data
US 2015/0134112 A1    May 14, 2015

(51) Int. Cl.
| | |
|---|---|
| *G06F 7/00* | (2006.01) |
| *B25J 15/00* | (2006.01) |
| *B25J 9/16* | (2006.01) |
| *B25J 11/00* | (2006.01) |
| *B25J 13/08* | (2006.01) |
| *B25J 19/02* | (2006.01) |

(52) U.S. Cl.
CPC ........... *B25J 15/0014* (2013.01); *B25J 9/1697* (2013.01); *B25J 11/0095* (2013.01); *B25J 13/089* (2013.01); *B25J 19/025* (2013.01); *G05B 2219/40613* (2013.01)

(58) Field of Classification Search
USPC ........................................................ 700/218
See application file for complete search history.

(56) References Cited

U.S. PATENT DOCUMENTS

| | | | |
|---|---|---|---|
| 6,206,441 B1 * | 3/2001 | Wen | H01L 21/67259 294/213 |
| 2003/0083776 A1 * | 5/2003 | Schauer | B23Q 3/186 700/218 |

* cited by examiner

*Primary Examiner* — Kyle Logan
(74) *Attorney, Agent, or Firm* — McClure, Qualey & Rodack, LLP

(57) ABSTRACT

Embodiments of mechanisms for measuring the distance between a robot blade and at least one measurement target are provided. A method for measuring the distance includes emitting a signal to the measurement target by a signal source assembly. The method also includes receiving the signal reflected from the measurement target by a signal reception assembly. The method further includes determining the distance between the robot blade and the measurement target. The distance is determined based on the time difference between the emission of the signal from the signal source assembly and the receipt of the signal by the signal reception assembly.

20 Claims, 13 Drawing Sheets

MECHANISMS FOR POSITIONING ROBOT BLADE

BACKGROUND

In the manufacturing of a product, the product is usually processed at many work stations or process machines. For example, to complete the fabrication of semiconductor wafers, various processing steps of deposition, cleaning, ion implantation, etching and passivation may be carried out before the semiconductor wafers are packaged for shipment.

In the vast majority of the processing steps, a special environment of either a high vacuum, low vacuum, gas plasma or other chemical environment is provided for the semiconductor wafers in the work stations or process machines. For instance, in a sputter process machine, a high vacuum environment is provided to surround the semiconductor wafer. Metal particles sputtered from a metal target can therefore travel toward and be deposited on the exposed surface of the semiconductor wafer. In other process machines, such as in a plasma enhanced chemical vapor deposition chamber, the plasma cloud of a reactant gas is formed over the semiconductor wafer positioned in a process chamber such that deposition of a chemical substance can occur on the semiconductor wafer.

In the work stations or process machines, the handling of the semiconductor wafer between locations must be conducted carefully to avoid damage to the semiconductor wafer. To accomplish this purpose, the handling of the semiconductor wafer is conducted automatically by a wafer transfer mechanism.

Therefore, accurate positioning of the wafer transfer mechanism in the work stations or process machines is an important aspect of the fabrication process.

BRIEF DESCRIPTION OF THE DRAWINGS

For a more complete understanding of the embodiments, and the advantages thereof, reference is now made to the following descriptions taken in conjunction with the accompany drawings.

DETAILED DESCRIPTION OF THE ILLUSTRATIVE EMBODIMENTS

The making and using of the embodiments of the disclosure are discussed in detail below. It should be appreciated, however, that the embodiments can be embodied in a wide variety of specific contexts. The specific embodiments discussed are merely illustrative, and do not limit the scope of the disclosure.

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows include embodiments in which the first and second features are formed in direct contact, and may also include embodiments in which additional features may be formed between the first and second features, such that the first and second features may not be in direct contact.

Some variations of the embodiments are described. Throughout the various views and illustrative embodiments, like reference numbers are used to designate like elements.

Figure 1:
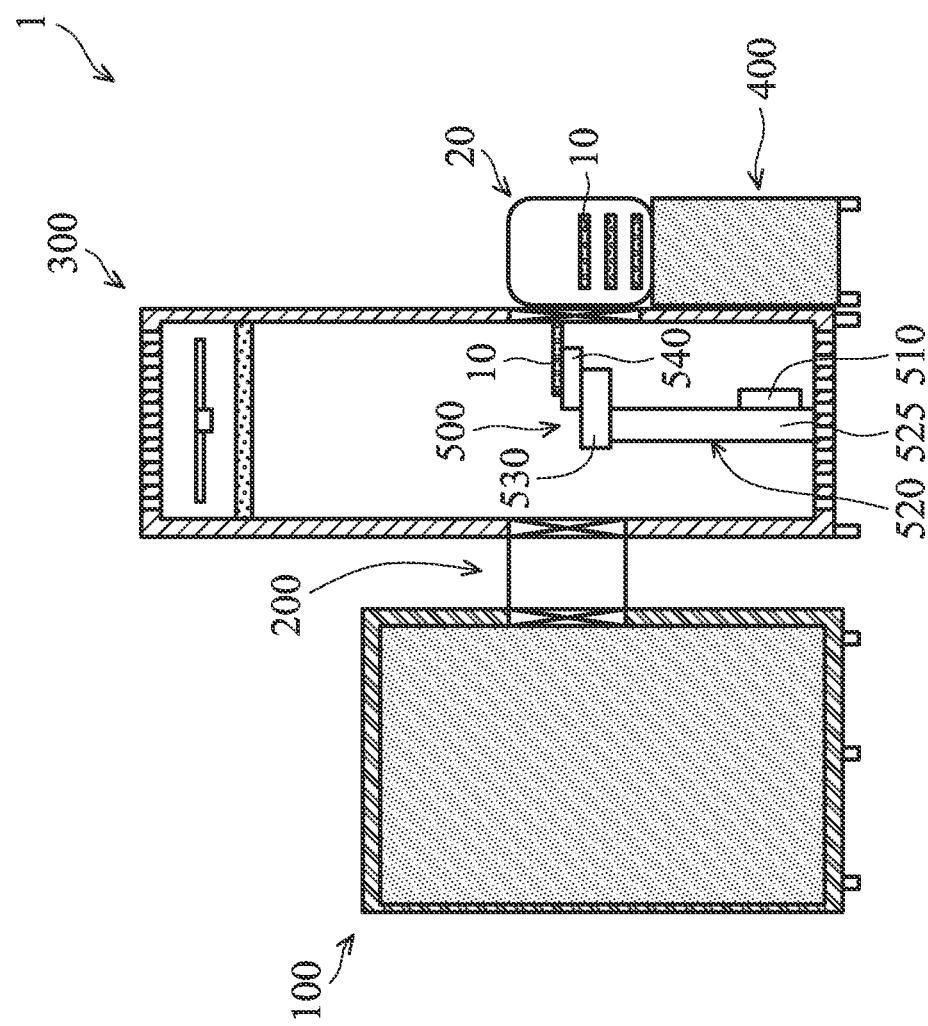
FIG. 1 shows a schematic view of a processing system, in accordance with some embodiments.

Referring to FIG. 1, a schematic view of a processing system 1 is illustrated, in accordance with some embodiments. The processing system 1 is configured to process one or more than one substrate 10. The substrate 10 may include a semiconductor, conductor, and/or insulator layers. In some embodiments, the substrate 10 includes layered semiconductors. Examples include the layering of a semiconductor layer on an insulator such as that used to produce a silicon-on-insulator (SOI) substrate, a silicon-on-sapphire substrate, or a silicon-germanium-on-insulator substrate, or the layering of a semiconductor on glass to produce a thin film transistor (TFT). The substrate 10 may go through many processing steps, such as lithography, etching, and/or doping before a completed die is formed.

The processing system 1 includes a process apparatus 100, a load lock apparatus 200, an interface apparatus 300, one or more load port 400, and one or more wafer transfer apparatus 500, in accordance with some embodiments. Additional features can be added to the processing system 1, and some of the features described below can be replaced or eliminated in other embodiments of the processing system 1.

The process apparatus 100 may be configured to perform any manufacturing procedure on the substrate 10. In some embodiments, the process apparatus 100 is configured to perform manufacturing procedures that include deposition processes such as physical vapor deposition (PVD), chemical vapor deposition (CVD), plasma-enhanced chemical vapor deposition (PECVD) and/or other deposition processes. In some embodiments, the process apparatus 100 is configured to perform manufacturing procedures that include etching processes such as wet and dry etching and ion beam milling. In some embodiments, the process apparatus 100 is configured to perform manufacturing procedures including lithographic exposure, ion implantation, thermal processes, cleaning processes, testing, any procedure involved in the processing of the substrate 10, and/or any combination of such procedures.

The load lock apparatus 200 is configured for preserving the atmosphere within the process apparatus 100 by separating it from the interface apparatus 300. The load lock apparatus 200 is arranged between the process apparatus 100 and the interface apparatus 300. When the substrate 10 is inserted into the load lock apparatus 200, the load lock apparatus 200 is sealed. The load lock apparatus 200 is capable of creating an atmosphere compatible with the process apparatus 100 or the interface apparatus 300 depending on where the loaded substrate 10 is scheduled to be next. This may require altering the gas content of the load lock apparatus 200 by such mechanisms as adding gas or creating a vacuum, along with other suitable means for adjusting atmosphere in the load lock apparatus 200. When the correct atmosphere has been reached, the substrate 10 can be accessed.

In some embodiments, the interface apparatus 300 is a facility interface. In some embodiments, the interface apparatus 300 includes an equipment front end module (EFEM). In some embodiments, the load port 400 is adjacent to the interface apparatus 300. In some embodiments, an overhead hoist transport (OHT) (not shown) transports a carrier 20, such as a standard mechanical interface (SMIF) or a front opening unified pod (FOUP) with the substrate 10 from a stocker (not shown) to the load port 400. When the carrier 20 is located on the load port 400, the substrate 10 in the carrier 20 is transferred to the interface apparatus 300 by the wafer transfer apparatus 500.

In some embodiments, the wafer transfer apparatus 500 is positioned in the interface apparatus 300. In some other embodiments, the processing system 1 includes multiple wafer transfer apparatuses 500. One of the wafer transfer apparatuses 500 is positioned in the interface apparatus 300, and the other wafer transfer apparatuses 500 is positioned in the process apparatus 100.

The wafer transfer apparatus 500 includes a control module 510, and one or more transferring module 520. The control module 510 includes circuits that control the operation of the transferring module 520. For example, the control module 510 may include controllers implemented with software codes that are programmed to operate the transferring module 520.

In some embodiments, the transferring module 520 includes one or more driving element 525, a robot arm 530, and a robot blade 540. The driving element 525, such as a motor, is controlled by the control module 510 and is coupled to the robot arm 530. The robot arm 530 is driven by the driving element 525 to provide both radial and rotational movement of the robot blades 540 in a fixed plane.

In some embodiments, the radial and rotational movements of the robot blades 540 can be coordinated or combined in order to pick up, transfer, and deliver the substrate 10 from one location within the processing system 1 to another. For example, with the wafer transfer apparatus 500, the substrate 10 is transferred between the carrier 20 and the load lock apparatus 200. In some other embodiments, the substrate 10 is transferred between the load lock apparatus 200 and one or more processing chamber (not shown in FIG. 1) of the process apparatus 100 by the wafer transfer apparatus 500. The structural feature of the robot blades 540 will be described in the later descriptions of FIG. 4.

Figure 2:
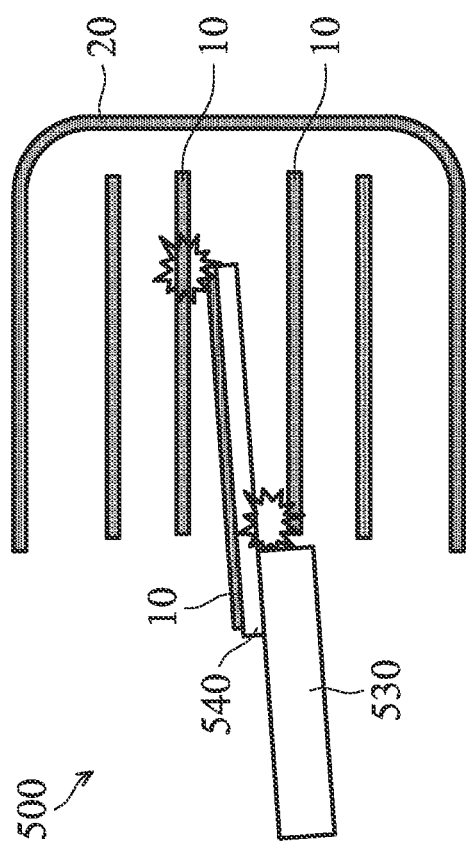
FIG. 2 shows a schematic view of a wafer transfer apparatus in a transferring process of a substrate, in accordance with some embodiments.

In some embodiments, some processing difficulties due to abnormal operations of the robot arm 530 may occur during the transferring process. For example, referring to FIG. 2, a schematic view illustrating the transferring process of the substrate 10 into the carrier 20 is shown. In the transferring process of the substrate 10, fixing means, such as screws or anchoring members, for fixing the robot arm 530 may be loosened, and the robot arm 530 and the robot blade 540 may not be kept in a horizontal configuration. As a result, the robot blade 540 may obliquely reach into the carrier 20, and an edge of the substrate 10 or an edge of the robot blade 540 may collide with the other substrate 10 which is already positioned in the carrier 20. The collision of the substrate 10 may cause serious damage to the substrate 10, or may even cause breakage of the substrate 10.

Therefore, it is desirable to find an alternative mechanism, which is capable of accurately performing the transferring process.

Figure 3:
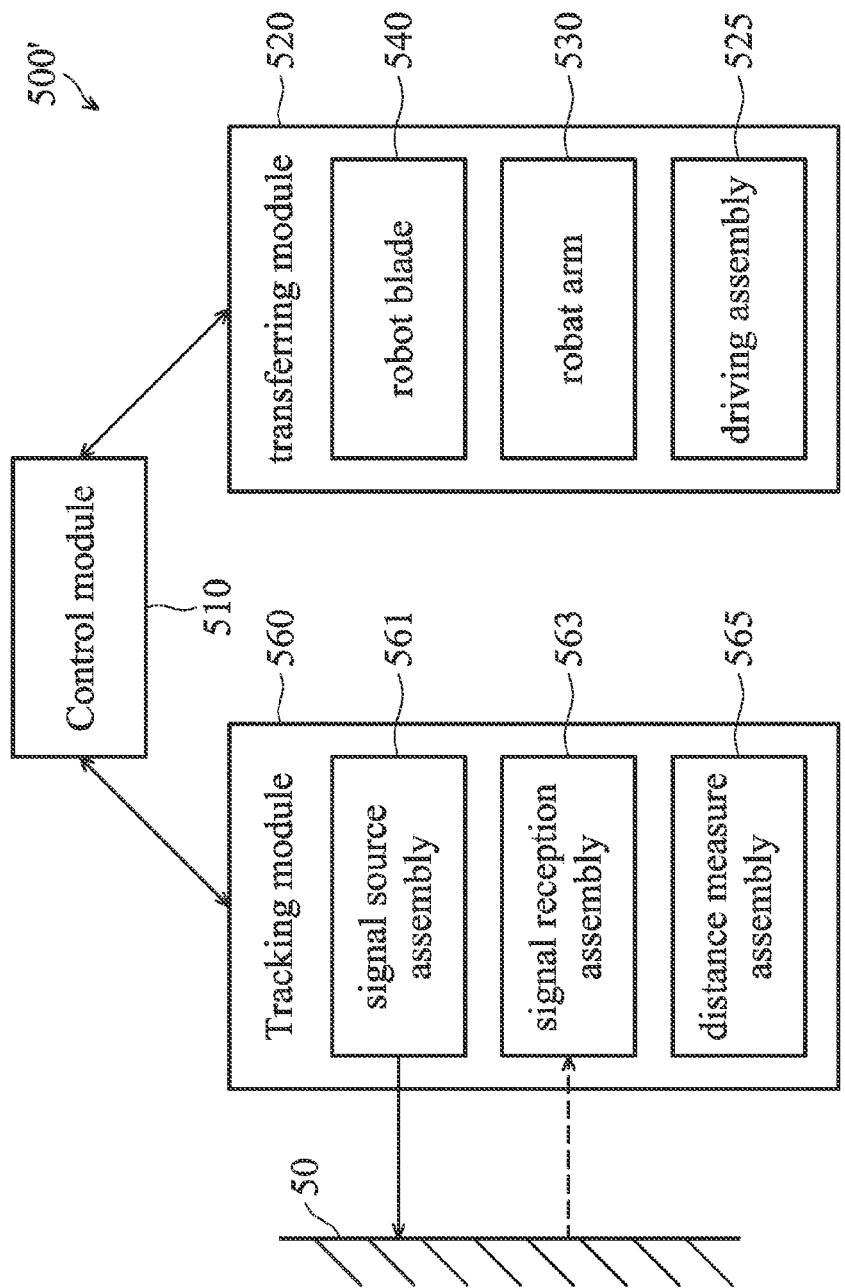
FIG. 3 shows a diagrammatic view of a wafer transfer apparatus, in accordance with some embodiments.

Referring to FIG. 3, a diagrammatic view of a wafer transfer apparatus 500' is illustrated, in accordance with some embodiments. In some embodiments, differences between the wafer transfer apparatus 500' and the wafer transfer apparatus 500 include the wafer transfer apparatus 500' further including a tracking module 560.

In some embodiments, the tracking module 560 includes a signal source assembly 561, a signal reception assembly 563, and a distance measure assembly 565. In some embodiments, the signal source assembly 561 and the signal reception assembly 563 are positioned over the robot blade 540. In some other embodiments, either the signal source assembly 561 or the signal reception assembly 563 is positioned over the robot blade 540, and the other is positioned over the environment, such as the wall of a carrier (not shown in FIG. 3) used for transporting the substrate (not shown in FIG. 3).

The signal source assembly 561 is configured to emit signal to one or more than one measurement target 50. In some embodiments, the signal emitted by the signal source assembly 561 includes energy beams such as laser, sonar, or microwave. The signal reception assembly 563 is configured to receive the signal generated by the signal source assembly 561. In some embodiments, the signal reception assembly 563 includes a laser detector, a sonar detector, or a microwave detector. The distance measure assembly 565 is electrically connected to the signal source assembly 561 and the signal reception assembly 563 for measuring the distance between the robot blade 540 and the measurement target 50.

It is appreciated that the number of the signal source assembly 561 and the signal reception assembly 563 can be varied according to demand. For example, referring to FIG. 4, a partial schematic view of wafer transfer apparatus 500' is shown, in accordance with some embodiments. In some embodiments, the tracking module 560' includes a number of signal source assemblies, such as signal source assemblies 561a, 561b, and 561c, and a number of signal reception assemblies, such as signal reception assemblies 563a, 563b, and 563c. The signal source assemblies 561a, 561b, and 561c and the signal reception assemblies 563a, 563b, and 563c are positioned over the robot blade 540, in accordance with some embodiments.

Figure 4:
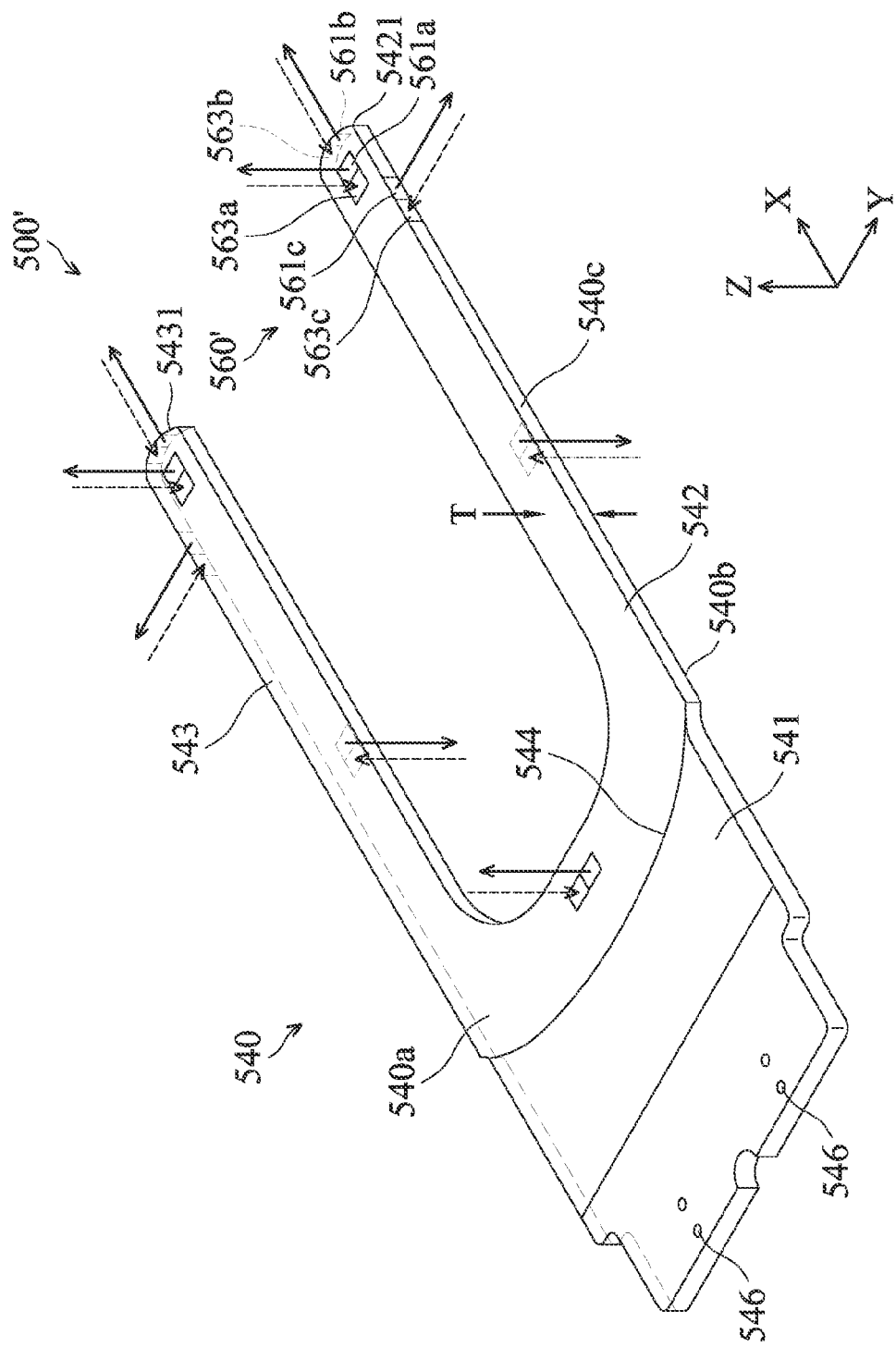
FIG. 4 shows a partial schematic view of a wafer transfer apparatus, in accordance with some embodiments.

The structural features of the robot blade 540, in accordance with some embodiments, are described hereinafter. As shown in FIG. 4, the robot blade 540 has an upper surface 540a, a bottom surface 540b, and a lateral edge 540c. A portion of the upper surface 540a is configured for supporting the substrate (not shown). The bottom surface 540b is opposite the upper surface 540a, and the lateral edge 540c is connected between the upper surface 540a and the bottom surface 540b.

The robot blade 540 can be formed in any shape and size according to need. In some embodiments, the robot blade 540 has a U-shape configuration and has very little thickness. As shown in FIG. 4, the robot blade 540 includes a base portion 541, a first finger 542, and a second finger 543. The first finger 542 and the second finger 543 extend outward from the base portion 541 to form the U-shaped portion of the robot blade 540. The thickness, as indicated by T in FIG. 4, of the robot blade 540 rages from about 2 mm to about 3 mm, so as to go through narrow slit valve for delivering or withdrawing substrate (not shown) to and from a destination. In some other embodiments, the robot blade 540 normally has an elongated construction in a rectangular shape.

In some embodiments, the upper surface 540a of the robot blade 540 is not flat, so as to prevent the substrate positioned on the robot blade 540 from slipping off. For example, the robot blade 540 also includes a raised portion 544. The raised portion 544 is arranged on the base portion 541. The upper surface 540a corresponding to the raised portion 544 is higher than the upper surface 540a corresponding to the base portion 541 by, for instance, approximately 0.3 mm. The raised portion 544 can be any shape to conform to the shape of the substrate (not shown) being transferred. In some other embodiments, the robot blade 540 further includes a number of raised portions 544, and the raised portions 544 are arranged at distal ends 5421 and 5431 of the first and second fingers 542 and 543, respectively.

In some embodiments, the robot blade 540 is fabricated of a high-temperature ceramic material such as quartz. In some embodiments, the robot blade 540 is provided with mounting holes 546 penetrating through the base portion 541. The robot blade 540 is configured for mounting to the robot arm 530 (FIG. 3) via fasteners, such as screws, positioned through the mounting holes 546.

Figure 5:
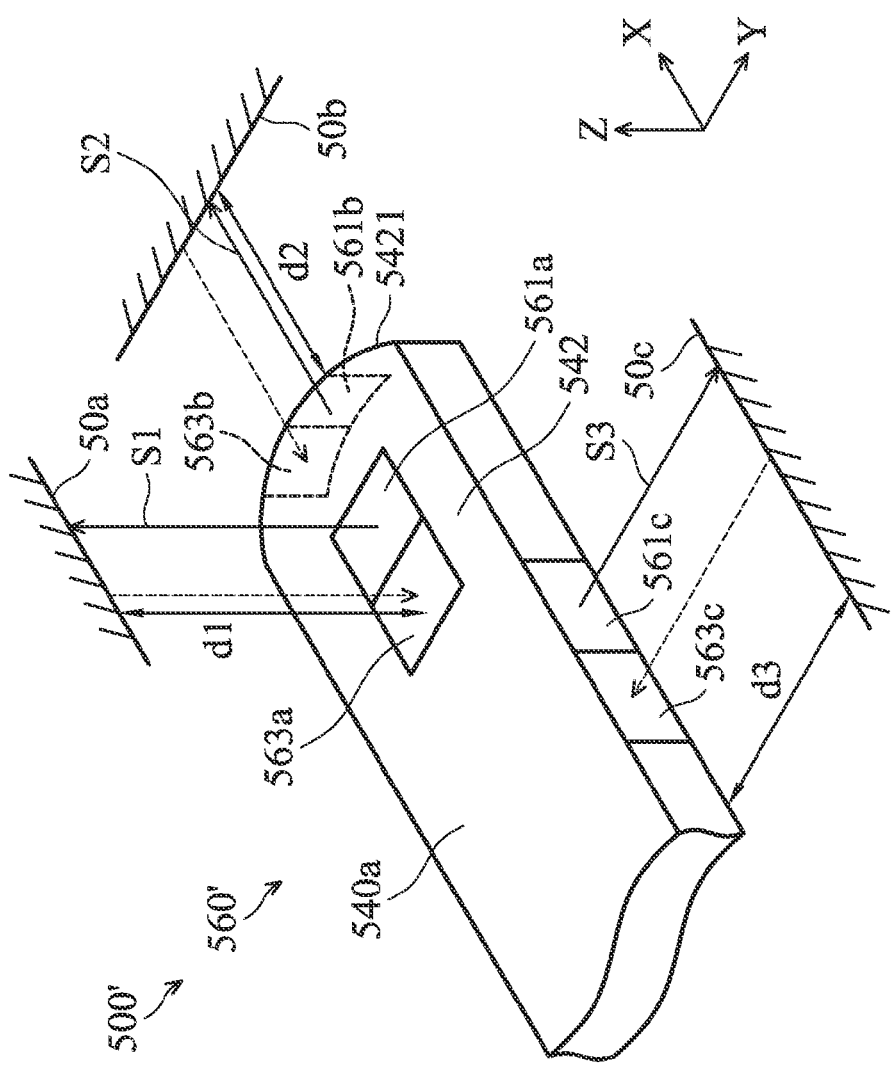
FIG. 5 shows an enlarged view of a wafer transfer apparatus, in accordance with some embodiments.

Referring to FIG. 5, an enlarged view of the wafer transfer apparatus 500' is shown, in accordance with some embodiments. The signal source assembly 563a is positioned at the upper surface 540a. The signal source assembly 563b is positioned at the lateral surface 540c corresponding to the distal end 5421. The signal source assembly 563c is positioned at the lateral surface 540c near the distal ends 5421 of the first finger 524. The signal reception assemblies 563a, 563b, and 563c are respectively adjacent to one of the signal source assemblies 561a, 561b, and 561c.

In some embodiments, the distances d1, d2, and d3 between the robot blade 540 and the first, second, and third measurement targets 50a, 50b, and 50c can be obtained by calculating the time difference between the emission of the signals S1, S2, and S3 from the signal source assemblies 561a, 561b, and 561c and the receipt of the signals S1, S2, and S3 by the signal reception assemblies 563a, 563b, and 563c.

For example, as shown in FIG. 5, the signal source assembly 561a emits a first signal S1 to a first measurement target 50a along a first direction (e.g., a direction parallel to the Z-axis). After the first signal S1 impinges on the first measurement target 50a, a portion of the first signal S1 is reflected by the first measurement target 50a along a direction opposite the first direction. The signal reception assembly 563a receives the portion of the first signal S1 reflected by the first measurement target 50a and generates an electrical signal to the distance measure assembly 565 (FIG. 3). As a result, the first distance d1 between the upper surface 540a and the first measurement target 50a is measured by the distance measure assembly 565 based on the time difference between the emission of the first signal S1 from the signal source assembly 561a and the receipt of the first signal S1 by the signal reception assembly 563a.

Similarly, the second distance d2 between the lateral surface 540c and a second measurement target 50b in a second direction (e.g., a direction parallel to the X-axis) can be measured based on the time difference between the emission of the second signal S2 from the signal source assembly 561b and the receipt of the first signal S2 by the signal reception assembly 563b. In addition, the distance d3 between the lateral surface 540c and a third measurement target 50c in a third direction (e.g., a direction parallel to the Y-axis) can be determined based on the time difference between the emission of the third signal S3 from the signal source assembly 561c and the receipt of the third signal S3 by the signal reception assembly 563c.

Figure 6:
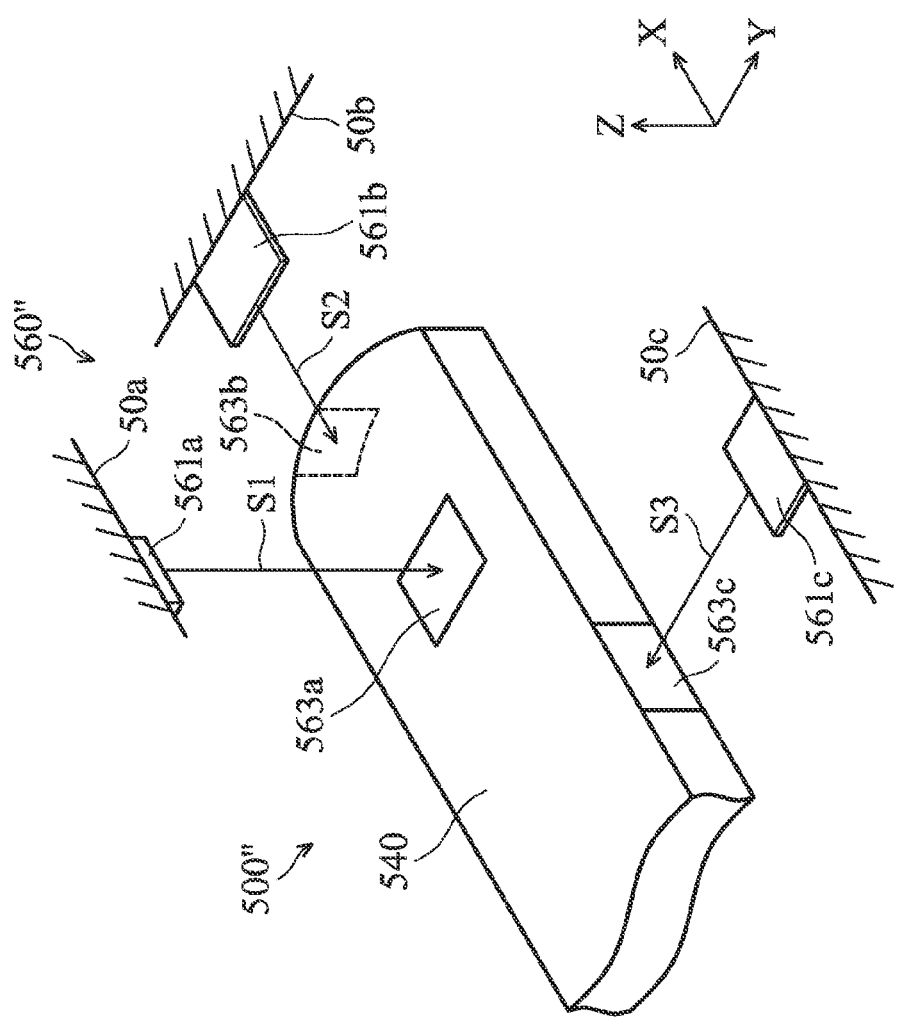
FIG. 6 shows an enlarged view of a wafer transfer apparatus, in accordance with some embodiments.

It is appreciated the positions, where the signal source assemblies and the signal reception assemblies are arranged, can be switched according to demand. As shown in FIG. 6, a partial schematic view of a wafer transfer apparatus 500" with a tracking module 560" is shown, in accordance with some embodiments. In some embodiments, differences between the wafer transfer apparatus 500' and the wafer transfer apparatus 500" include the signal source assemblies 561a, 561b, and 561c being positioned over the first, second, and third measurement targets 50a, 50b, and 50c. Signals S1, S2, and S3 emitted from the signal source assemblies 561a, 561b, and 561c are received by the signal reception assemblies 563a, 563b, and 563c. Since the signal source assemblies 561a, 561b, and 561c are in fixed location in the environment, the position of the robot blade 540 can be obtained by calculating the time difference between the emission of the signal from the signal source assemblies 561a, 561b, and 561c and the receipt of the signal by the signal reception assemblies 563a, 563b, and 563c.

Figure 7:
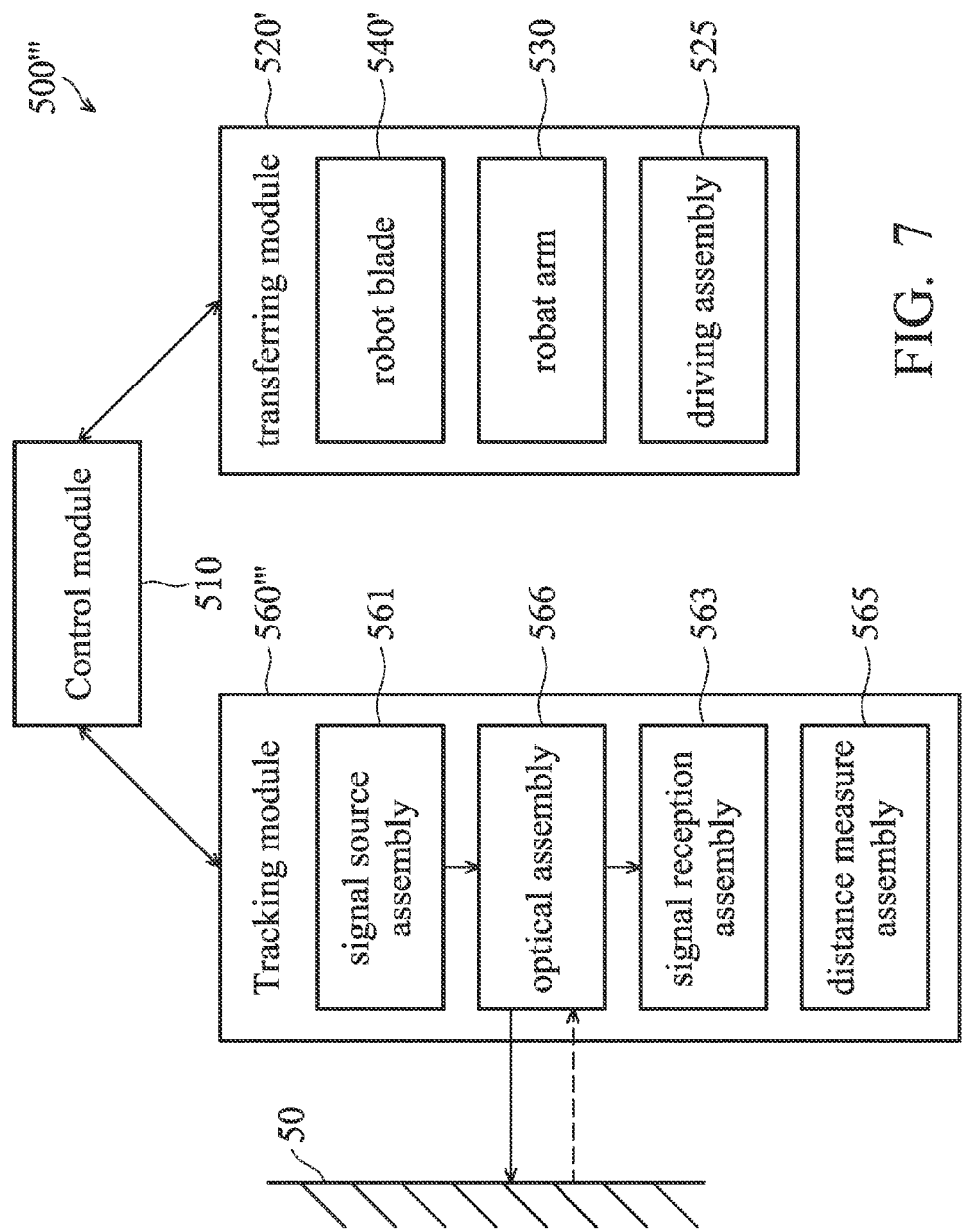
FIG. 7 shows a partial schematic view of a transferring module, in accordance with some embodiments.

Referring to FIG. 7, a diagrammatic view of a wafer transfer apparatus 500''' is illustrated, in accordance with some embodiments. In some embodiments, differences between the wafer transfer apparatus 500''' and the wafer transfer apparatus 500' include the robot blade 540 being replaced by a robot blade 540', and the tracking module 560 being replaced by a tracking module 560'''.

Figure 8:
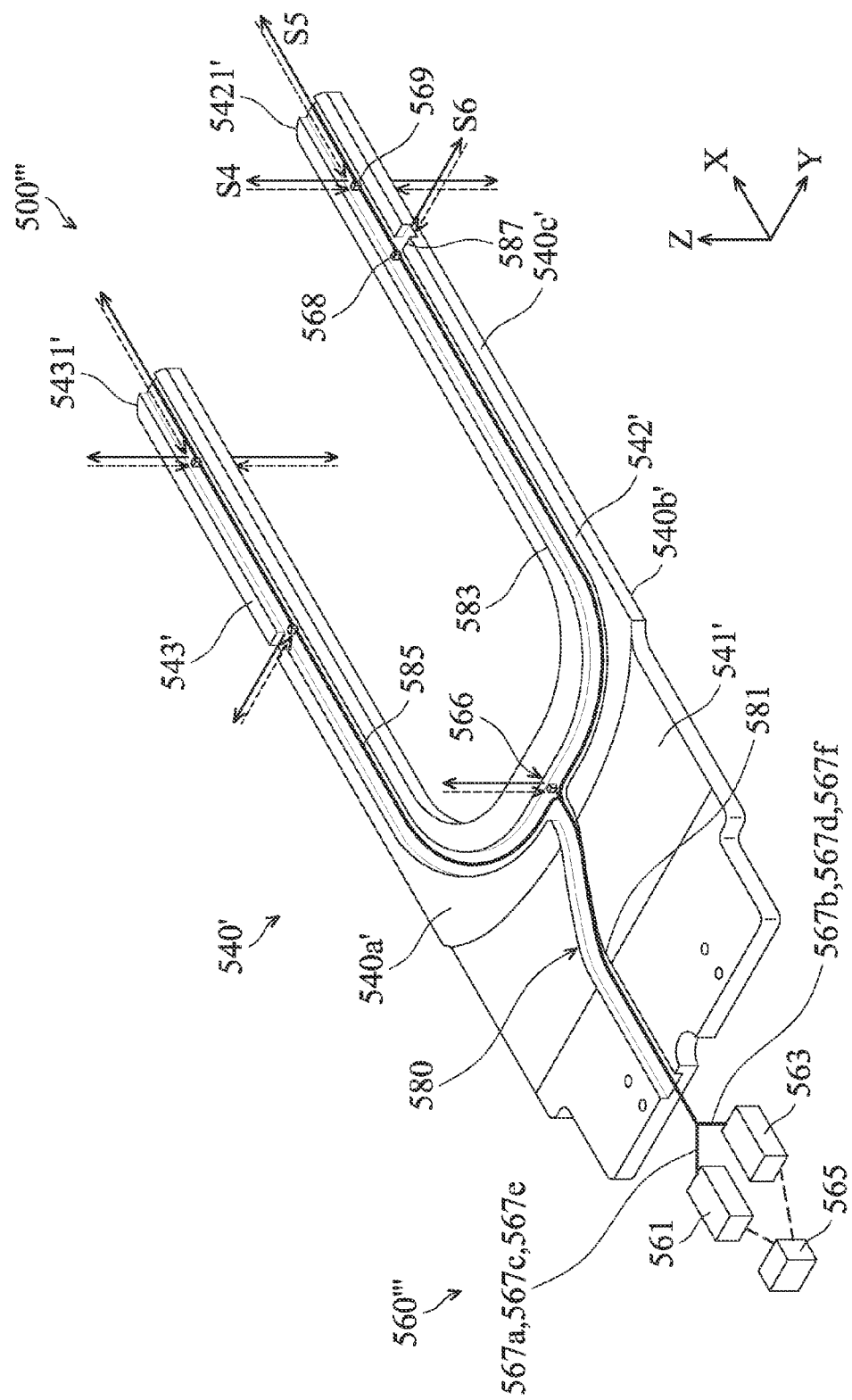
FIG. 8 shows a partial schematic view of a wafer transfer apparatus, in accordance with some embodiments.

Referring to FIG. 8, a partial schematic view of the wafer transfer apparatus 500' is shown, in accordance with some embodiments. In some embodiments, the robot blade 540' has a similar configuration as the robot blade 540 as shown in FIG. 4; however, the robot blade 540' further includes one or more than one groove, such as a groove 580, formed at the upper surface 540a' and/or the bottom surface 540b'.

In some embodiments, the groove 580 is formed at the upper surface 540a' and extends substantially along a longitudinal direction (e.g., a direction parallel to the X-axis) of the robot blade 540'. In some embodiments, the groove 580 includes a first segment 581, a second segment 583, and a third segment 585. The first segment 581 is formed on the base portion 541'. The second segment 583 is formed on the first finger 542' and connected to the first segment 581. The third segment 585 is formed on the second finger 543' and is connected to the first segment 581. In some embodiments, the second segment 583 extends from the first segment 581 to a distal end 5421' of the first finger 542', and the third segment 585 extends from the first segment 581 to a distal end 5431' of the second finger 543'.

In some embodiments, the groove 580 further includes one or more than one branch portion 587 connected to the first segment 581, the second segment 583, or the third segment 585. The branch portion 587 connects the first segment 581, the second segment 583, or the third segment 585 to the lateral edge 540c'. For example, as shown in FIG. 7, the branch portion 587 is connected to the second segment 583 and extends to the lateral edge 540c' adjacent to the distal end 5421' of the first finger 542'.

In some embodiments, the groove 580 is formed by a mechanical abrasion method or by a chemical etching method. In some embodiments, the groove 580 has a uniform dimension of about 1 mm to about 2 mm in depth. However, the depth of the groove 580 can be varied in different segments.

In some embodiments, the tracking module 560''' further includes an optical assembly 566. The optical assembly 566 is arranged at the groove 580 and includes a number of optical fibers, such as optical fibers 567a-567f, and one or more than one optical element, such as optical elements 568 and 569, in accordance with some embodiments. The optical fibers 567a-567f extend from the first segment 581 to the second segment 583 of the groove 580. In some embodiments, the depth of the groove 380 is larger than the thickness of each the optical fibers 567a-567f. Therefore, the optical fibers 567a-567f will not be embossed from the outer surface of the robot blade 540', and the size of the mechanism is reduced.

In some embodiments, the optical fibers 567a, 567c and 567e are coupled to a signal source assembly 561, and the optical fibers 567b, 567d and 567f are coupled to the signal reception assembly 563. In some other embodiments, the optical fibers 567a, 567c and 567e are coupled to different signal source assemblies (not shown in figure), and the optical fibers 567b, 567d and 567f are coupled to the different signal reception assemblies (not shown in figure).

Figure 9:
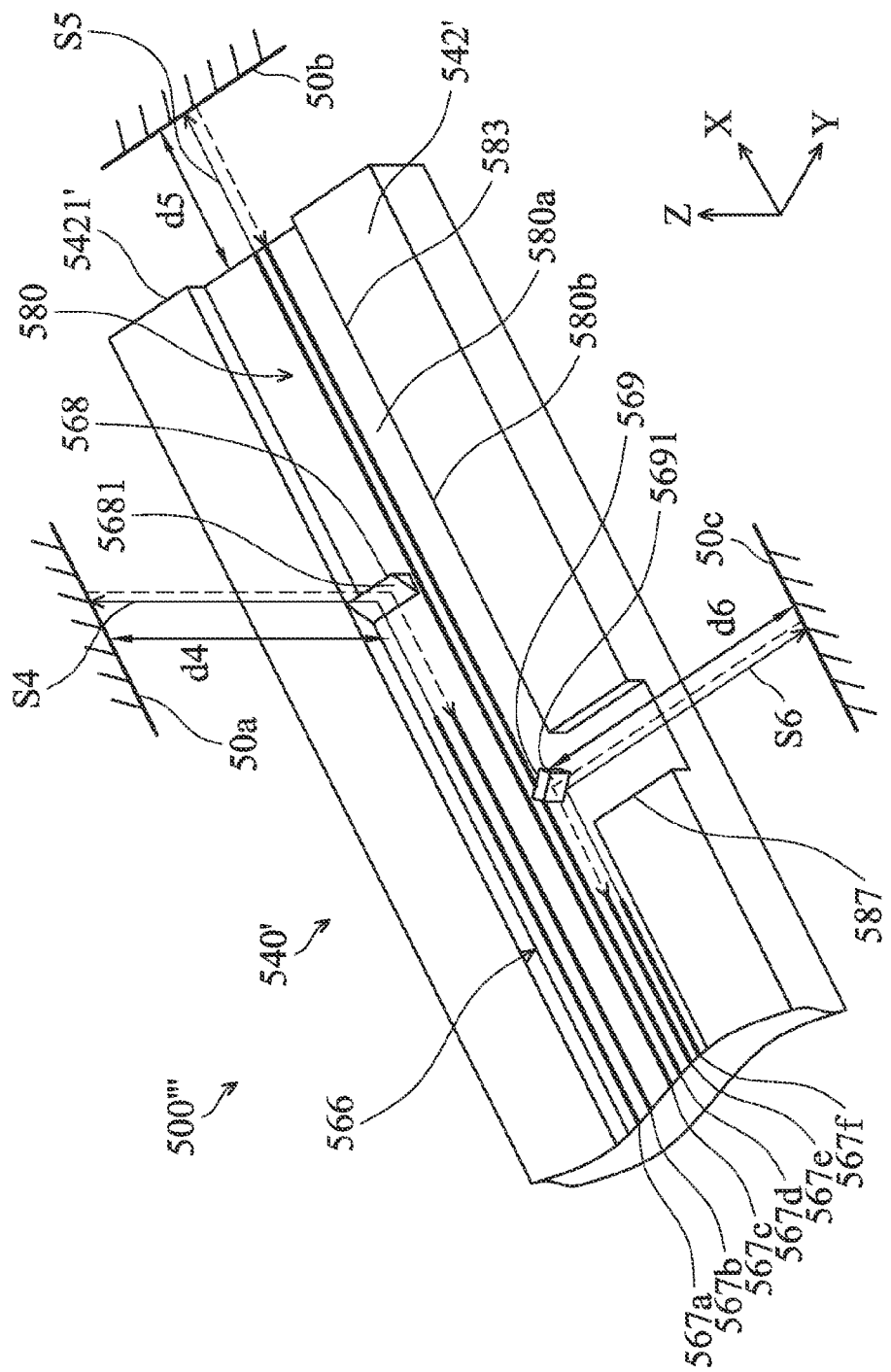
FIG. 9 shows an enlarged view of a wafer transfer apparatus, in accordance with some embodiments.

As shown in FIG. 9, in some embodiments, the optical element 568 is positioned at the second segment 583 of the groove 580 and corresponds to one end of each optical fiber 567a and 567b. The optical element 568 has an incident surface 5681. The incident surface 5681 is arranged at an angle of about 45 degree relative to the bottom surface 580a of the groove 580. However, the incident surface 5681 can be arranged at any angle relative to the bottom surface 580a. The optical element 569 is positioned at the position where the second segment 583 is connected to the branch portion 587 and corresponds to one end of each optical fiber 567e and 567f. The optical element 569 has an incident surface 5691. The incident surface 5691 is arranged at an angle of about 45 degree relative to a side surface 580b of the groove 580. However, the incident surface 5691 can be arranged at any angle relative to the side surface 580b.

The optical elements 568 and 569 are configured for switching the transmitting path of an incident signal. In some embodiments, the optical elements 568 and 569 are prisms or mirror. Incident signals, such as a laser beam, may be reflected by the incident surfaces 5681 and 5691 of the optical elements 568 and 569. In some embodiments, the optical elements 568 and 569 are polarizing beam splitters. A portion of incident signal, such as a laser beam, may be reflected by the optical elements 568 and 569, and the other portion of the incident light may be refracted by the optical elements 568 and 569.

To measure distance between measurement targets and the robot blade 540', signals S4, S5, and S6 are emitted from the signal source assembly 561 (FIG. 8) and directed to the first, second, and third measurement targets 50a, 50b, and 50c by optical fibers 567a, 567c and 567e and optical elements 568 and 569. After being reflected by the first, second, and third measurement targets 50a, 50b, and 50c, the signals S4, S5, and S6 are received by optical fibers 567b, 567d and 567f and optical elements 568 and 569 and transmitted to the signal reception assembly 563 (FIG. 8). As a result, the distances d4, d5, and d6 between the robot blade 540' and the first, second, and third measurement targets 50a, 50b, and 50c can be obtained by calculating the time difference between the emission of the signals S4, S5, and S6 from the signal source assembly 561 and the receipt of the signals S4, S5, and S6 by the signal reception assembly 563.

Referring again to FIG. 8, in some embodiments, the groove 380 is formed on the bottom surface 540b', and the optical assembly 566 is arranged at the groove 380 formed on the bottom surface 540b', so as to measure the distance between the bottom surface 540b' and one or more than one measurement target.

Figure 10:
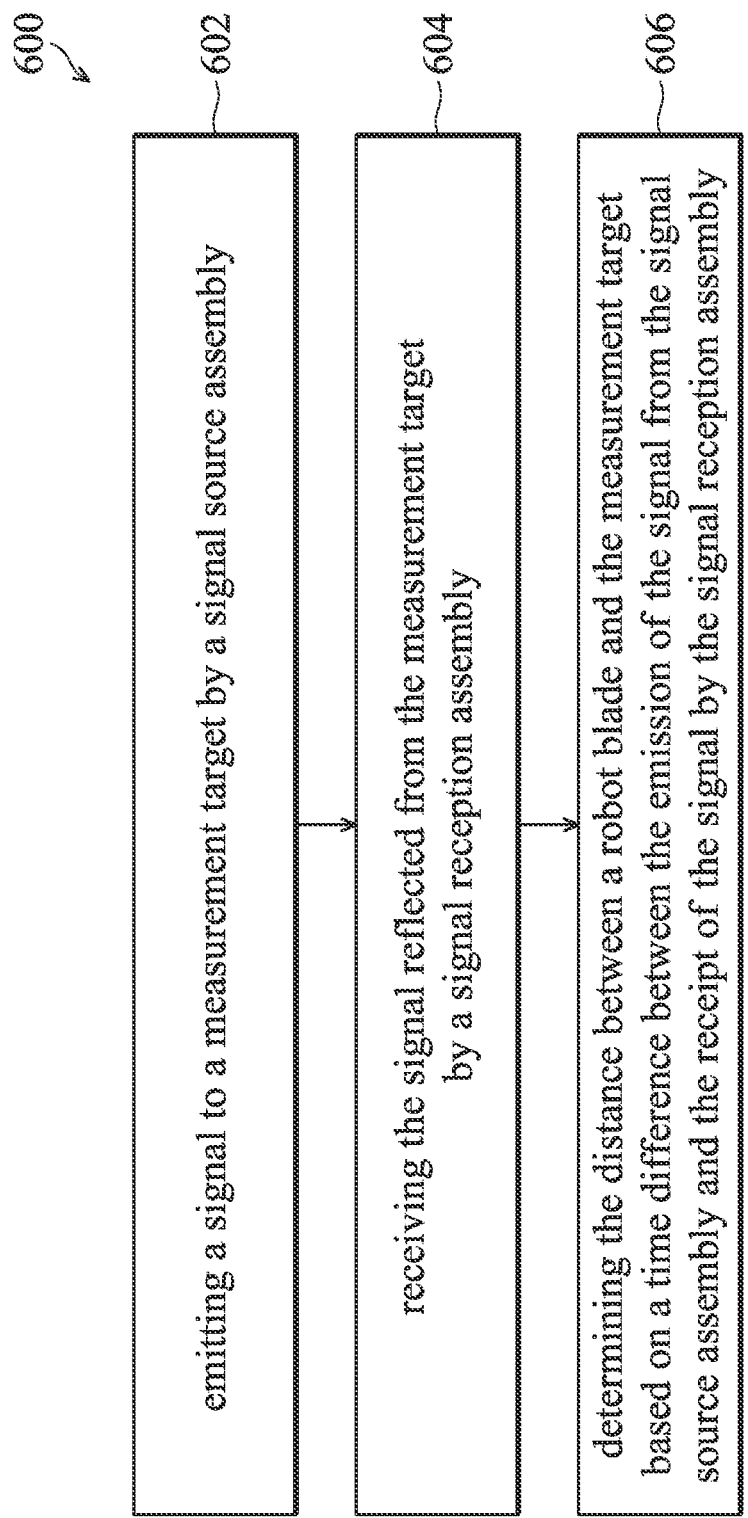
FIG. 10 shows a flow chart illustrating a method for measuring the distance between a robot blade and a measurement target, in accordance with some embodiments.

Referring to FIG. 10, a flow chart illustrating a method 600 for measuring the distance between the robot blade (such as the robot blade 540' shown in FIG. 8) and one or more than one measurement target is shown, in accordance with some embodiments.

The method 600 begins with operation 602, in which a signal is generated by a signal source assembly (such as the signal source assembly 561 as shown in FIG. 8) to the measurement target. In some embodiments, the signal emitted by the signal source assembly 561 is directed to three measurement targets by an optical assembly (such as the optical assembly 566 as shown in FIG. 8). The three measurement targets are respectively arranged along a first direction, a second direction, and a third direction. In some embodiments, the first direction, the second direction, and the third direction are perpendicular to each other.

The method 600 continues with operation 604, in which the signal reflected from the measurement target(s) is received by a signal reception assembly (such as the signal reception assembly 563 as shown in FIG. 8). In some embodiments, the signal reflected by the measurement target(s) is transmitted to the signal reception assembly via the optical assembly 566.

The method 600 continues with operation 606, in which the distance between the robot blade 540' and the measurement target(s) is determined based on the time difference between the emission of the signal from the signal source assembly 561 and the receipt of the signal by the signal reception assembly 563.

In some embodiments, when the robot blade 540' is out of alignment by a certain threshold amount, a control module (such as the control module 510 as shown in FIG. 7) is operative to actuate a driving element (such as the driving element 525 as shown in FIG. 7) to adjust the position of the robot blade 540' into the desired position.

Figure 11:
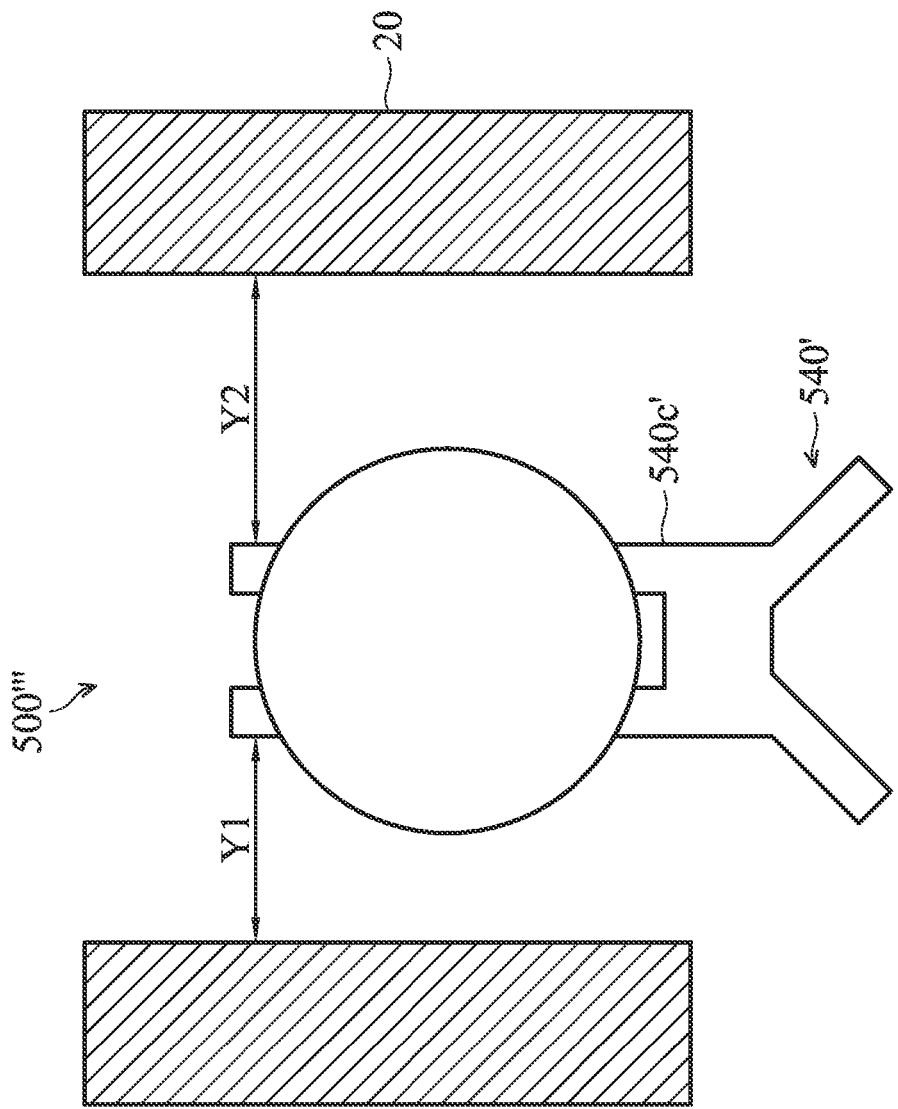
FIG. 11 shows a schematic view of a wafer transfer apparatus in a transferring process of a substrate, in accordance with some embodiments.

For example, as shown in FIG. 11, the distances Y1 and Y2 between two opposite sides of the lateral edge 540c' of the robot blade 540' and measurement targets, such as two opposite inner walls of the carrier 20, are measured. If the robot blade 540' is out of alignment, the distance Y1 is not equal to the distance Y2. The control module 510 (FIG. 7) is operative to actuate the driving element 525 (FIG. 7) to adjust the position of the robot blade 540' into a desired position if the degree of misalignment is within a threshold.

In some embodiments, when the degree of wafer misalignment is above the threshold, which the driving element 525 cannot correct, the control module 510 issues a signal that results in an interruption of the transferring process to await manual intervention in order to correct the alignment problem.

Figure 12:
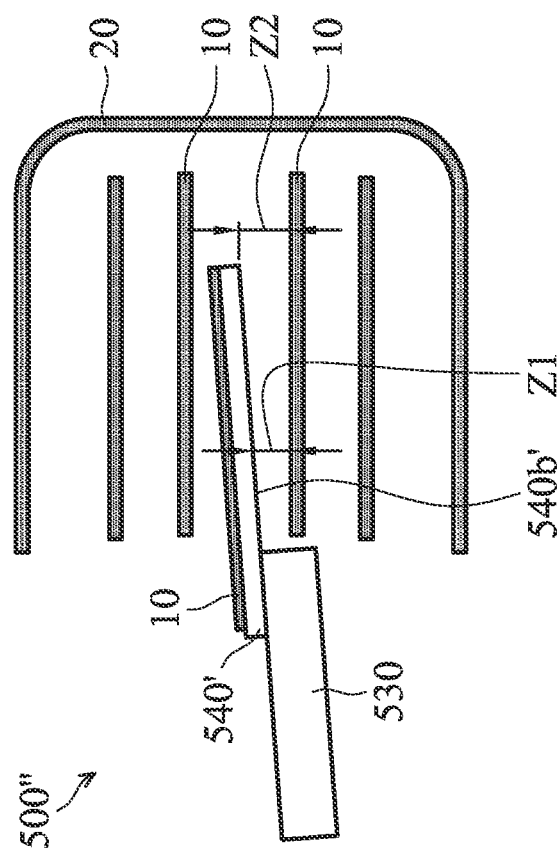
FIG. 12 shows a schematic view of a wafer transfer apparatus in a transferring process of a substrate, in accordance with some embodiments.

For example, as shown in FIG. 12, the distances Z1 and Z2 between two positions of the bottom surface 540b' of the robot blade 540' and a measurement target, such as adjacent substrate 10, are measured. If the robot blade 540' is not in a horizontal configuration, the distance Z1 is not equal to the distance Z2. To avoid damage to the substrate 10, the control module 510 (FIG. 7) issues a signal that results in an interruption of the transferring process to await manual intervention in order to correct the alignment problem.

In some embodiments, by continuously measuring the distance between the robot blade 540' and the object, real-time position or tracking of the robot blade 540' is realized. Therefore, the drawback of the robot blade, described in FIG. 2, cannot be positioned is overcome.

Figure 13:
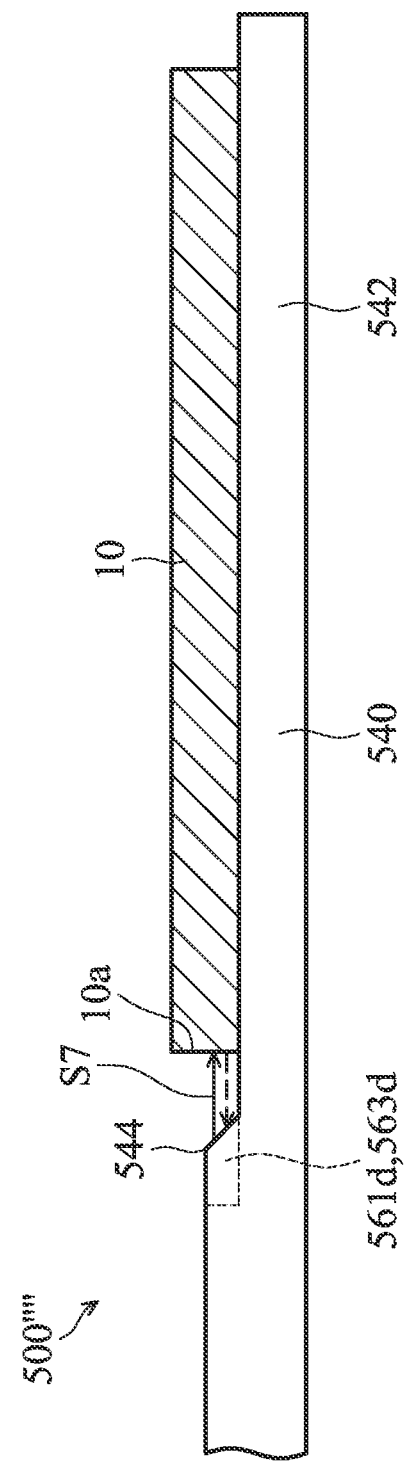
FIG. 13 shows a partial schematic view of a wafer transfer apparatus, in accordance with some embodiments.

Referring to FIG. 13, a partial schematic view of the wafer transfer apparatus 500'''' is shown, in accordance with some embodiments. In some embodiments, differences between the wafer transfer apparatus 500'''' and the wafer transfer apparatus 500' include the wafer transfer apparatus 500'''' further including a signal source assembly 561d and a signal reception assembly 563d. The signal source assembly 561d is positioned at the raised portion 544 of the robot blade 540. The signal reception assembly 563d is positioned adjacent to the signal source assembly 561d.

In some embodiments, when the wafer transfer apparatus 500' is used for supporting the substrate 10, the signal source assembly 561d emits a signal S7 to the substrate 10 along a direction parallel to the first finger 542. The signal S7 is reflected by the lateral surface 10a of the substrate 10 and received by the signal reception assembly 563d. By calculating the time difference between the emission of the signal S7 from the signal source assembly 561d and the receipt of the signal S7 by the signal reception assembly 563d, the position of the substrate 10 on the robot blade 540 can be obtained.

In some embodiments, by continuously sensing the position of the substrate 10, the vibration frequency of the substrate 10 can be detected, so as to prevent the substrate 10 from being damaged due to shaking of the robot blade 540.

Embodiments of the disclosure have many advantages. For example, the distance between the robot blade and the measurement target in three dimensional directions can be detected as the robot blade is moving, such that the position of the robot blade can be calibrated in real-time. An automatic wafer transfer alignment and calibration mechanism is provided. Damage to the substrate can be prevented and product yield is increased.

Embodiments of mechanisms for measuring distance between a robot blade and an object are provided. A signal from a signal source assembly to a signal reception assembly is transmitted. By calculating the time of flight of the signal, the distance between the robot blade and the object can be measured. Since the distance can be determined while engaged in the process of transferring a substrate, the position of the robot blade can be monitored in real-time. Therefore, manufacturing efficiency and production yield of the substrate are greatly improved.

In accordance with some embodiments, a mechanism for transferring a substrate is provided. The mechanism includes a robot blade and a tracking module. The robot blade has an upper surface for supporting the substrate. It also has a bottom surface opposite the upper surface and a lateral edge connected between the upper surface and the bottom surface. The tracking module is configured for measuring a first distance and a second distance. The first distance is between the bottom surface or the upper surface and a first measurement target along a first direction. The second distance is between the lateral edge and a second measurement target along a second direction. The first direction is different from the first direction.

In accordance with some embodiments, a mechanism for transferring a substrate is provided. The mechanism includes a robot blade for supporting the substrate. The mechanism also includes a signal source assembly configured for emitting a signal. The mechanism further includes a signal reception assembly configured for receiving the signal reflected by a measurement target. In addition, the mechanism includes a distance measure assembly configured for determining the distance between the robot blade and the measurement target. The distance is determined based on the time difference between the emission of the signal from the signal source assembly and the receipt of the signal by the signal reception assembly.

In accordance with some embodiments, a method for measuring the distance between a robot blade for supporting a substrate and at least one measurement target. The method includes emitting a signal to the measurement target by a signal source assembly. The method also includes receiving the signal reflected from the measurement target by a signal reception assembly. The method further includes determining the distance between the robot blade and the measurement target. The distance is determined based on the time difference between the emission of the signal from the signal source assembly and the receipt of the signal by the signal reception assembly.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A mechanism for transferring a substrate, comprising:
a robot blade comprising an upper surface for supporting the substrate, a bottom surface opposite the upper surface, and a lateral edge connected between the upper surface and the bottom surface; and
a tracking module, configured for measuring a first distance between the bottom surface or the upper surface and a first measurement target along a first direction and a second distance between the lateral edge and a second measurement target along a second direction different from the first direction;
wherein the robot blade is configured to emit a first signal from a location along the lateral edge of the robot blade and between the upper surface and the bottom surface such that the tracking module measures the second distance based on the first signal emitted from the lateral edge of the robot blade.

2. The mechanism as claimed in claim 1, wherein the tracking module is configured for measuring a third distance between the lateral edge and a third measurement target along a third direction perpendicular to the first direction and the second direction.

3. The mechanism as claimed in claim 1, wherein the first direction and the second direction are perpendicular to each other.

4. The mechanism as claimed in claim 1, further comprising a means for detecting a vibration of the substrate positioned on the robot blade.

5. The mechanism as claimed in claim 1, wherein the tracking module comprises:
an optical assembly, arranged at the robot blade and configured for receiving signals emitted along the first and second directions; and
a distance measure assembly, coupled to the optical assembly and configured for determining the first distance and the second distance based on the signals transmitted by the optical assembly;
wherein the signals emitted along the first and second directions include the first signal.

6. The mechanism as claimed in claim 5, wherein the optical assembly further comprises a prism positioned on a path through which the first signal passes.

7. The mechanism as claimed in claim 5, wherein the tracking module further comprises a signal source assembly configured for generating the first signal, wherein the first signal from the signal source assembly is reflected by the first and second measurement targets and received by the optical assembly.

8. The mechanism as claimed in claim 5, wherein the optical assembly comprises an optic fiber extending on the robot blade.

9. The mechanism as claimed in claim 8, wherein the robot blade further comprises a groove formed at the upper surface or the bottom surface, and the optic fiber extends along the groove.

10. A mechanism for transferring a substrate, comprising:
a robot blade comprising an upper surface for supporting the substrate, a bottom surface, and a lateral edge connected between the upper surface and the bottom surface;
a signal source assembly configured for emitting a signal from the lateral edge of the robot blade;
a signal reception assembly configured for receiving the signal reflected by a measurement target; and
a distance measure assembly configured for determining the distance between the robot blade and the measurement target based on the time difference between the emission of the signal from the signal source assembly and the receipt of the signal by the signal reception assembly.

11. The mechanism as claimed in claim 10, wherein the first direction, the second direction, and the third direction are perpendicular to each other.

12. The mechanism as claimed in claim 10, further comprising a means for detecting a vibration of the substrate positioned on the robot blade.

13. The mechanism as claimed in claim 10, further comprising an optical assembly arranged at the robot blade and coupled to the signal source assembly, wherein the signal emitted from the signal source assembly is directed by the optical assembly so as to transmit along a first direction, a second direction, and a third direction.

14. The mechanism as claimed in claim 13, wherein the optical assembly is arranged on the surface of the robot blade.

15. The mechanism as claimed in claim 14, wherein the robot blade comprises a groove formed at the surface of the robot blade, and the optical assembly is positioned in the groove.

16. A method for measuring the distance between a robot blade for supporting a substrate and at least one measurement target, comprising:
emitting, from a lateral edge of the robot blade, a signal to the measurement target by a signal source assembly;
receiving the signal reflected from the measurement target by a signal reception assembly; and
determining the distance between the robot blade and the measurement target based on the time difference between the emission of the signal from the signal source assembly and the receipt of the signal by the signal reception assembly.

17. The method as claimed in claim 16, further comprising interrupting the movement of the robot blade as the distance between the robot blade and the measurement target is above a threshold.

18. The method as claimed in claim 16, further comprising calibrating the position of the robot blade into a desired position as the distance between the robot blade and the measurement target is within a threshold.

19. The method as claimed in claim 16, wherein the signal emitted by the signal source assembly is directed to three different measurement targets, and wherein the three measurement targets are respectively arranged along a first direction, a second direction, and a third direction.

20. The method as claimed in claim 19, wherein the first direction, the second direction, and the third direction are perpendicular to each other.

* * * * *